United States Patent
Fang (10) Patent No.: US 8,630,977 B2
(45) Date of Patent: Jan. 14, 2014

(54) METHOD, APPARATUS, AND SYSTEM FOR DATA SYNCHRONIZATION

(75) Inventor: Ping Fang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/101,442

(22) Filed: May 5, 2011

(65) Prior Publication Data

US 2011/0208698 A1 Aug. 25, 2011

Related U.S. Application Data

(63) Continuation of application No. PCT/CN2009/074522, filed on Oct. 20, 2009.

(30) Foreign Application Priority Data

Nov. 6, 2008 (CN) .......................... 2008 1 0173571

(51) Int. Cl.
*G06F 17/00* (2006.01)

(52) U.S. Cl.
USPC .......................................... 707/610; 707/624

(58) Field of Classification Search
USPC .................... 707/609–626, 655–661
See application file for complete search history.

(56) References Cited

U.S. PATENT DOCUMENTS

| | | | |
|---|---|---|---|
| 2002/0119789 A1 | 8/2002 | Friedman | |
| 2003/0167409 A1* | 9/2003 | Sussman ....................... | 713/201 |
| 2006/0069791 A1* | 3/2006 | Patrick et al. ................. | 709/230 |
| 2006/0123010 A1* | 6/2006 | Landry et al. .................. | 707/10 |
| 2007/0112880 A1 | 5/2007 | Yang et al. | |
| 2008/0010358 A1 | 1/2008 | Jin | |
| 2008/0066191 A1* | 3/2008 | Farber et al. ..................... | 726/28 |
| 2008/0172747 A1* | 7/2008 | Hurtado et al. ................. | 726/26 |
| 2008/0291944 A1 | 11/2008 | Liu | |
| 2009/0036111 A1* | 2/2009 | Danford et al. ............... | 455/419 |
| 2009/0054033 A1* | 2/2009 | Pratt et al. ..................... | 455/410 |
| 2009/0254613 A1 | 10/2009 | Xu | |
| 2010/0008500 A1* | 1/2010 | Lisanke et al. ................ | 380/201 |

FOREIGN PATENT DOCUMENTS

| | | |
|---|---|---|
| CN | 1436924 A | 8/2003 |
| CN | 1655513 A | 8/2005 |
| CN | 1859160 A | 11/2006 |
| CN | 101090452 A | 12/2007 |

(Continued)

OTHER PUBLICATIONS

Blackford, J., WT-148 Configuration Synchronization Proposed Solution, DSL Home Technical Working Group.

(Continued)

*Primary Examiner* — Wilson Lee
(74) *Attorney, Agent, or Firm* — Conley Rose, P.C.; Grant Rodolph; Nicholas K. Beaulieu (57) ABSTRACT

A method, an apparatus, and a system for data synchronization are disclosed. The method includes: receiving a parameter value change notification message which carries a parameter change event and/or a digest of a specific parameter; and synchronizing data according to the parameter value change notification message. The synchronizing the data includes synchronizing the data in a parameter change record table stored in a Customer Premises Equipment (CPE). An Auto-Configuration Server (ACS) includes a receiving unit and a synchronizing unit. In this way, the requirement on the ACS is lowered and the burden of the ACS is relieved.

19 Claims, 3 Drawing Sheets

(56) References Cited

FOREIGN PATENT DOCUMENTS

| | | |
|---|---|---|
| CN | 101183967 A | 5/2008 |
| CN | 101202630 A | 6/2008 |
| CN | 101202745 A | 6/2008 |
| CN | 101436924 A | 5/2009 |
| EP | 1750469 A1 | 2/2007 |
| WO | WO 2008/058483 A1 | 5/2008 |

OTHER PUBLICATIONS

First Chinese Office Action dated (mailed) Jul. 13, 2010, issued in related Chinese Application No. 200510090318.4 Huawei Technologies Co. Ltd.

Second Chinese Office Action (mailed) Jan. 10, 2011, issued in related Chinese Application No. 200510090318.4 Huawei Technologies Co. Ltd.

International Search Report for International Application No. PCT/CN2009/074522, mailed Feb. 21, 2008 Huawei Technologies Co., Ltd.

Written Opinion of the International Searching Authority for International Application No. PCT/CN2009/074522, mailed Feb. 4, 2010, 10 pages.

Foreign Communication From a Counterpart Application, European Application 09824385.0, European Office Action dated Jan. 3, 2013, 7 pages.

Foreign Communication From a Counterpart Application, PCT Application PCT/CN2009/074522, European Search Report dated Mar. 2, 2012, 10 pages.

"TR-069 CPE WAN Management Protocol v1.1," XP-002493850, Version: Issue 1, Amendment 2, Broadband Forum Technical Report, Dec. 1, 2007, 138 pages.

* cited by examiner

METHOD, APPARATUS, AND SYSTEM FOR DATA SYNCHRONIZATION

CROSS-REFERENCE TO RELATED APPLICATIONS

This application is a continuation of International Patent Application No. PCT/CN2009/074522, filed on Oct. 20, 2009, which claims priority to Chinese Patent Application No. 200810173571.X, filed on Nov. 6, 2008, both of which are hereby incorporated by reference in their entireties.

FIELD OF THE INVENTION

The present invention relates to communication technologies, and in particular, to a method, an apparatus and a system for data synchronization.

BACKGROUND OF THE INVENTION

Digital Subscriber Line (DSL) is a broadband access technology. Applications based on broadband access technologies, such Voice over Internet Protocol (VoIP) and Internet Protocol Television (IPTV), require IP-based terminal devices on the DSL.

The IP-based terminal devices are known as Customer Premises Equipment (CPE). An Auto-Configuration Server (ACS) synchronizes data with the CPE, and modifies and sets parameter values of the CPE according to the synchronized data so as to achieve the purpose of auto configuration of the CPE.

In a prior art, the synchronization of data between the ACS and the CPE includes: when the value of a parameter with the attribute "Notify ACS of Changes" in the CPE changes, the CPE sets up a connection with the ACS and reports a parameter value change event that carries a parameter list to the ACS, where the parameter list includes all parameter values of the CPE. The ACS synchronizes the parameter values included in the parameter list reported by the CPE. The event will be dropped when the CPE is restarted.

During the research on the prior art, the inventor finds at least the following disadvantages: the synchronization of data on the CPE to the ACS adds the burden on the ACS. Specifically, when the value of a parameter with the attribute "Notify ACS of Changes" in the CPE changes, the CPE sets up a connection with the ACS immediately and reports the specific changes, despite whether the ACS is busy in processing other transactions. The time when the changes are reported is decided by the CPE while the ACS cannot decide whether to receive the changes according to its need.

SUMMARY OF THE INVENTION

Accordingly, embodiments of the present invention provide a method, an apparatus, and a system for data synchronization to relieve the burden of the ACS.

A method for data synchronization provided in an embodiment of the present invention includes:

receiving a parameter value change notification message which carries a parameter change event and/or a digest of a specific parameter; and synchronizing data according to the parameter value change notification message, where the synchronizing the data includes: synchronizing data in a parameter change record table stored in a CPE.

Another method for data synchronization where a parameter change record table is created provided in an embodiment of the present invention includes:

when a value of a specific parameter changes, storing parameter change information in the parameter change record table, and generating a parameter change event and/or calculating a digest of the specific parameter according to requirements of an ACS; and reporting a parameter value change notification message that carries the parameter change event and/or the digest of the specific parameter to the ACS.

An ACS provided in an embodiment of the present invention includes:

a receiving unit, configured to receive a parameter value change notification message which carries a parameter change event and/or a digest of a specific parameter; and a synchronizing unit, configured to synchronize data according to the parameter value change notification message received by the receiving unit, wherein the synchronizing the data includes synchronizing data in a parameter change record table according to the parameter change record table stored in a CPE.

A CPE provided in an embodiment of the present invention includes:

a creating unit, configured to create a parameter change record table;

a storing unit, configured to store parameter change information in the parameter change record table created by the creating unit when a value of a specific parameter changes;

a parameter unit, configured to, when the value of the parameter changes, generate a parameter change event, and/or calculate a digest of the specific parameter; and a reporting unit, configured to report a parameter value change notification message that carries the parameter change event generated and/or the digest of the specific parameter calculated by the parameter unit to an ACS.

A system for data synchronization provided in an embodiment of the present invention includes a CPE and an ACS, where:

the CPE communicates with the ACS and is configured to: create a parameter change record table, and when the value of a specific parameter changes, store parameter change information in the parameter change record table, generate a parameter change event, and/or calculate a digest of the specific parameter according to requirements of the ACS, and report a parameter value change notification message that carries the parameter change event and/or the digest of the specific parameter to the ACS.

In the embodiments of the present invention, the CPE only notifies the server of the occurrence of a parameter change, but not the specific change, and the ACS synchronizes data in the parameter change record table according to the parameter change record table stored in the CPE. Therefore, the requirement on the ACS is lowered and the burden of the ACS is relieved.

DETAILED DESCRIPTION OF THE EMBODIMENTS

To better explain the technical features and benefits of the embodiments of the present invention, the embodiments of the present invention will be described in detail with reference to the accompanying drawings.

Figure 1:
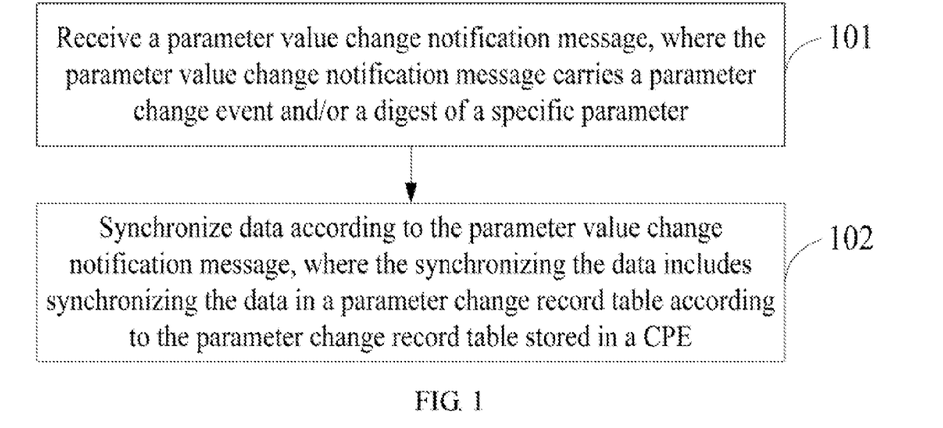
FIG. 1 is a flowchart of a method according to an embodiment of the present invention.

FIG. 1 is a flowchart of a method according to an embodiment of the present invention. The method for data synchronization includes the following steps:

Step 101: Receive a parameter value change notification message, which carries a parameter change event and/or a digest of a specific parameter.

Step 102: Synchronize data according to the parameter value change notification message, where the synchronizing the data includes synchronizing the data in a parameter change record table according to the parameter change record table stored in the CPE.

It can be seen that, the CPE only notifies the server of the occurrence of a parameter change, but not the specific change. The ACS synchronizes the data in the parameter change record table according to the parameter change record table stored in the CPE. That is, the ACS can determine when to read the parameter change record table stored in the CPE according to the condition of the ACS, so that the ACS can synchronize the parameter changes of the CPE more flexibly. Therefore, the requirement on the ACS is lowered and the burden of the ACS is relieved. The steps shown in FIG. 1 are described in detail with reference to exemplary embodiments.

In the embodiments of the present invention, the definition of the parameter value change notification in the parameter attribute structure is modified.

In the prior art, the definitions of the parameter value change notification in the parameter attribute structure are described in Table 1.

TABLE 1

| Parameter Name | Parameter Type | Parameter Description |
| --- | --- | --- |
| Parameter Name | Character (256) | Indicates the name of the parameter that the attribute is defined for. The name must be a full name of the parameter instead of a partial path parameter name. |
| Notification Attribute | Integer [0:2] | Indicates whether the CPE needs to include a value change of the specified parameter in an Inform message and whether the CPE needs to set up a session with the ACS to report the parameter value change message when the value of the specified parameter changes. The definitions of the attribute values are as follows:<br>0 = Notification Off. For the specified parameter, the CPE does not notify the ACS of a change of the parameter value.<br>1 = Passive notification. When the value of the specified parameter changes, the CPE must include the new parameter value in the parameter list and include the parameter list in an Inform message when the next session is set up.<br>2 = Active notification. When the value of the specified parameter changes, the CPE must set up a session with the ACS and include a parameter value change event in the parameter list carried in an Inform message. |

In the embodiments of the present invention, after the definitions of the parameter value change notification in the parameter attribute structure are modified, the new definitions of the parameter value change notification in the parameter attribute structure are described in Table 2.

TABLE 2

| Parameter Name | Parameter Type | Parameter Description |
| --- | --- | --- |
| Parameter Name | Character (256) | Indicates the name of the parameter that the attribute is defined for. The name must be a full name of the parameter instead of a partial path parameter name. |
| Notification Attribute | Integer [0:2] | Indicates whether the CPE needs to include a value change of the specified parameter in an Inform message and whether the CPE needs to set up a session with the ACS to report the parameter value change message when the value of the specified parameter changes. The definitions of the attribute values as follows:<br>0 = Notification Off. For the specified parameter, the CPE does not notify the ACS of a change of the parameter value.<br>1 = Passive notification. When the value of the specified parameter changes, the CPE includes the parameter change in a parameter change record table and includes the parameter value change event in an Inform message when the next session is set up. However, the CPE must not put a new parameter value into the parameter list.<br>2 = Active notification. When the value of the specified parameter changes, the CPE includes the parameter change in a parameter change record table, and must set up a session with the ACS and include the parameter value change event in an Inform message. However, the CPE must not put a new parameter value into the parameter list. |

From a comparison between Table 1 and Table 2, in the method embodiments of the present invention, it is necessary to create a parameter change record table and include the new parameter value in the parameter change record table, instead of including the new parameter value in a parameter list. The form of the parameter change record table is listed in Table 3.

TABLE 3

| Parameter Name | New Parameter Value | Time of Change |
| --- | --- | --- |
|  |  |  |

It should be noted that Table 3 is only an exemplary implementation of the method provided in the embodiments of the present invention. The parameter change record table provided in the embodiments of the present invention is not limited to this form. For example, the table may record information such as the old parameter value.

In the method embodiments of the present invention, when the value of a parameter marked as passive notification or active notification changes, the CPE stores the change-related information (for example, the new parameter value and the time of parameter change) in the parameter change record table shown in Table 3. For a parameter marked as passive notification, the CPE parameter value change event is included in the Inform message when the next session is set up. For a parameter marked as active notification, the CPE may set up a connection with the ACS immediately and include the CPE parameter value change event in the Inform message. For a parameter marked as active notification, the CPE may also include the CPE parameter value change event in the Inform message when the next session is set up, as in the case of a parameter marked as passive notification, instead of setting up a connection with the ACS immediately.

Figure 2:
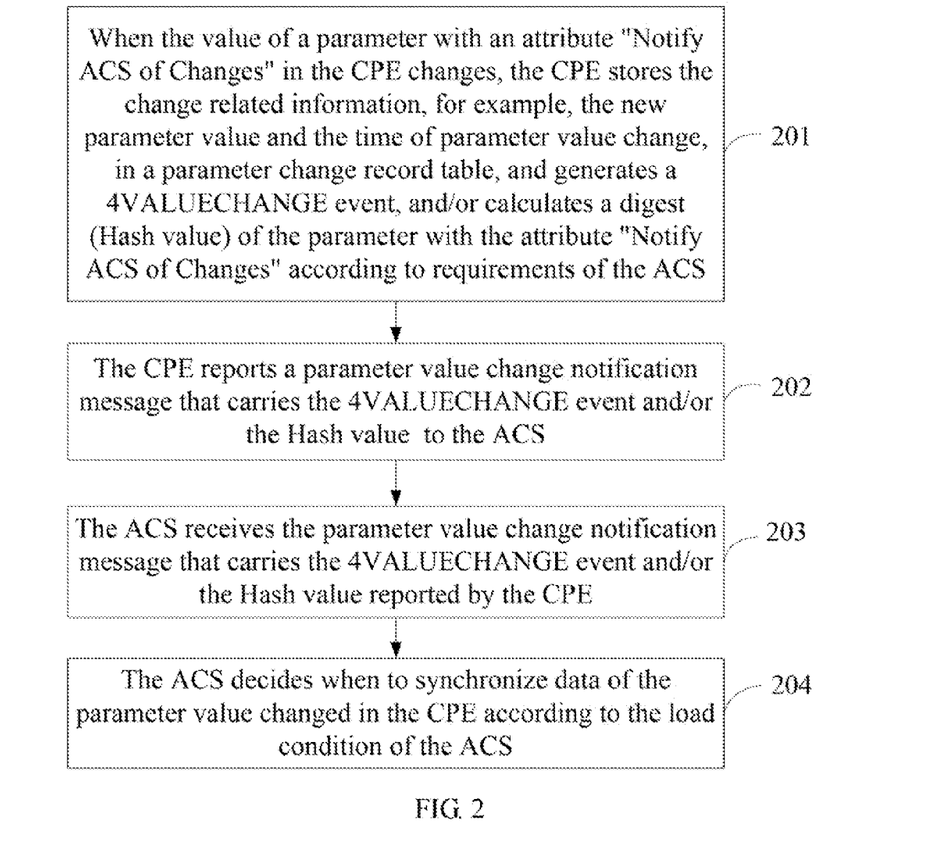
FIG. 2 is a flowchart of a method according to an exemplary embodiment of the present invention.

With the definitions of the parameter value change notification in the parameter attribute structure and the created parameter change record table provided in the method embodiments of the present invention, the ACS can synchronize data changed in the CPE and needed by the ACS to the ACS. FIG. 2 is a flowchart of the method according to an embodiment of the present invention. The method for data synchronization includes the following steps:

Step 201: When the value of a parameter with an attribute "Notify ACS of Changes" in the CPE changes, the CPE stores the change-related information, for example, the new parameter value and the time of parameter value change, in a parameter change record table, and generates a 4VALUECHANGE event, and/or calculates a digest (Hash value) of the parameter with the attribute "Notify ACS of Changes" according to requirements of the ACS.

Step 202: The CPE reports a parameter value change notification message that carries the 4VALUECHANGE event and/or the Hash value to the ACS.

It should be specially noted that, in step 202, if the CPE reports the 4VALUECHANGE event, the 4VALUECHANGE event does not include a parameter list. The CPE only notifies the ACS of the occurrence of a parameter change, but not the specific parameter change information.

Step 203: The ACS receives the parameter value change notification message that carries the 4VALUECHANGE event and/or the Hash value reported by the CPE.

In step 203, if the ACS receives only the 4VALUECHANGE event reported by the CPE, the ACS may know that the value of the parameter with the attribute "Notify ACS of Changes" changes according to the 4VALUECHANGE event. If the ACS receives both the 4VALUECHANGE event and the Hash value, the ACS compares the currently received Hash value and the last received Hash value to further determine that the value of the parameter with the attribute "Notify ACS of Changes" changes. If the ACS receives only the Hash value, the ACS may know whether the value of the parameter with the attribute "Notify ACS of Changes" changes by comparing the currently received Hash value and the last received Hash value. If the value of the parameter with the attribute "Notify ACS of Changes" changes, step 204 is executed; if the value of the parameter with the attribute "Notify ACS of Changes" does not change, the procedure ends.

Step 204: The ACS decides when to synchronize data of the changed parameter value in the CPE according to the load condition of the ACS.

In step 204, the ACS may decide to synchronize the data of the changed parameter value in the CPE immediately, or decide to synchronize the data later.

When the ACS performs data synchronization, the ACS sends a command to the CPE to read all data in the parameter change record table in the CPE, and synchronizes the data in the parameter change record table to the ACS. After the data in the parameter change record table is synchronized to the ACS, the CPE deletes the synchronized data. In addition, in steps 201 to 204, the 4VALUECHANGE event and the data in the parameter change record table can be stored continuously after the CPE is restarted.

From the above description, the CPE only notifies the ACS of the occurrence of a parameter change, but not the specific change, and the ACS decides when to synchronize data to the ACS according to its own condition. For non-emergency data, the ACS may choose to perform synchronization at night or in hours with light load. Therefore, the requirement on the ACS is lowered and the burden of the ACS is relieved. In the case of a parameter marked as active notification, the CPE includes a CPE parameter value change event in the Inform message when the next session is set up, instead of setting up a connection with the ACS immediately. This further reduces the burden of the ACS.

In addition, because the 4VALUECHANGE event and the data in the parameter change record table can be stored continuously after the CPE is restarted, the ACS can synchronize the data accurately.

Figure 3:
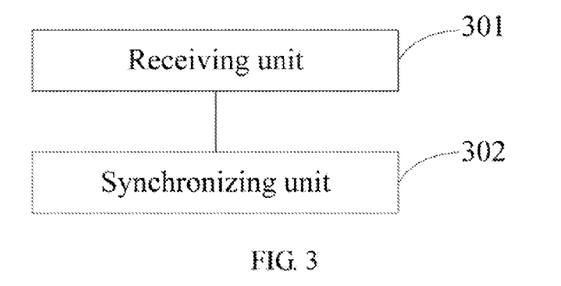
FIG. 3 is a structure diagram of an ACS according to an embodiment of the present invention.

FIG. 3 is a structure diagram of an ACS according to an embodiment of the present invention. The ACS includes:

a receiving unit 301, configured to receive a parameter value change notification message, where the parameter value change notification message carries a parameter change event and/or a digest of a specific parameter; and a synchronizing unit 302, configured to synchronize data according to the parameter value change notification message, where the synchronizing the data includes synchronizing the data in a parameter change record table according to the parameter change record table stored in the CPE.

Figure 4:
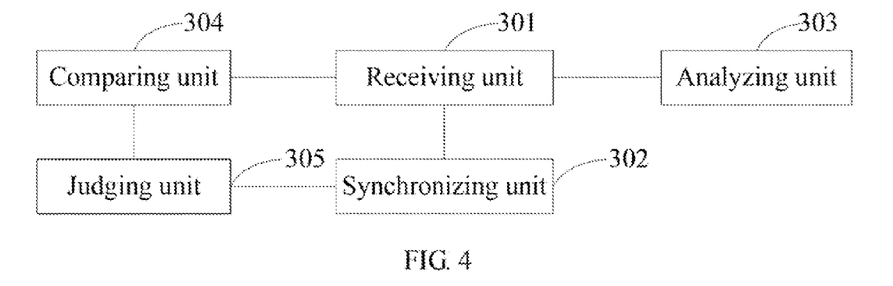
FIG. 4 is a structure diagram of an ACS according to an exemplary embodiment of the present invention.

It can be seen that, the CPE only notifies the ACS of the occurrence of a parameter change, but not the specific change. The ACS synchronizes the data in the parameter change record table according to the parameter change record table stored in the CPE. Therefore, the requirement on the ACS is lowered and the burden of the ACS is relieved. With reference to the method provided in the exemplary embodiment, FIG. 4 is a structure diagram of an ACS according to an exemplary embodiment of the present invention. On the basis of FIG. 3, the ACS further includes:

an analyzing unit 303, configured to decide when to synchronize a value of the changed parameter according to the parameter value change notification message received by the receiving unit 301 and according to a current load;

a comparing unit 304, configured to compare the digest received by the receiving unit 301 with a last received digest; and a judging unit 305, configured to judge whether the value of the specific parameter in the CPE changes according to the comparison performed by the comparing unit 304.

The synchronizing unit 302 is further configured to synchronize the data according to the parameter value change notification message received by the receiving unit 301 and according to the judgment of the judging unit 305.

Figure 5:
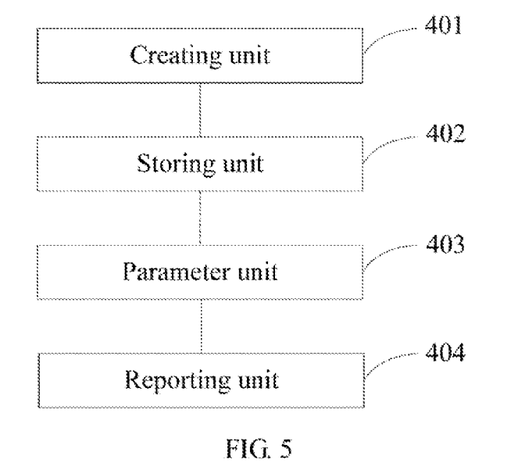
FIG. 5 is a structure diagram of a CPE according to an embodiment of the present invention.

FIG. 5 is a structure diagram of a CPE according to an embodiment of the present invention. As shown in FIG. 5, the CPE includes:

a creating unit 401, configured to create a parameter change record table;

a storing unit 402, configured to store parameter change information in the parameter change record table created by the creating unit 401 when a value of a specific parameter changes;

a parameter unit 403, configured to, when the value of the parameter changes, generate a parameter change event, and/or calculate a digest of the specific parameter; and a reporting unit 404, configured to report a parameter value change notification message that carries the parameter change event generated and/or the parameter digest calculated by the parameter unit 403 to an ACS.

Figure 6:
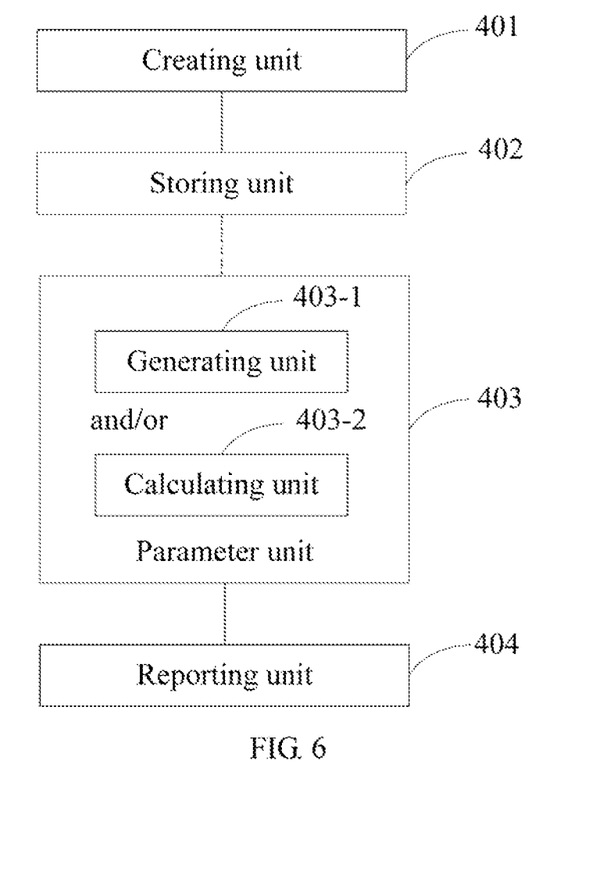
FIG. 6 is a structure diagram of a CPE according to an exemplary embodiment of the present invention.

With reference to the method provided in the exemplary embodiment, FIG. 6 is a structure diagram of a CPE according to an exemplary embodiment of the present invention, where the parameter unit 403 includes:

a generating unit 403-1, configured to generate the parameter change event when the value of the parameter changes.

Or, the parameter unit 403 includes:

a calculating unit 403-2, configured to calculate the digest of the specific parameter according to requirements of the ACS.

Or, the parameter unit 403 includes:

a generating unit 403-1, configured to generate the parameter change event when the value of the parameter changes; and a calculating unit 403-2, configured to calculate the digest of the specific parameter according to requirements of the ACS.

The operations performed by the above units are described in detail with reference to the exemplary embodiment of the method.

Where the parameter unit 403 includes only the generating unit 403-1: when the value of a parameter with the attribute "Notify ACS of Changes" in the CPE changes, the storing unit 402 of the CPE stores the change-related information, for example, the new parameter value and the time of parameter value change, in the parameter change record table created by the creating unit 401, and the generating unit 403-1 generates a 4VALUECHANGE event. The reporting unit 404 reports a parameter value change notification message that carries the 4VALUECHANGE event to the ACS.

For a parameter marked as passive notification, the CPE parameter value change event is included in the Inform message when the next session is set up. For a parameter marked as active notification, the CPE may set up a connection with the ACS immediately and include the CPE parameter value change event in the Inform message. For a parameter marked as active notification, the CPE may also include the CPE parameter value change event in the Inform message when the next session is set up, as in the case of a parameter marked as passive notification, instead of setting up a connection with the ACS immediately.

The receiving unit 301 of the ACS receives the parameter value change notification message from the CPE, and the analyzing unit 302 decides when to synchronize the data of the changed parameter value according to the parameter value change notification message received by the receiving unit 301 and the current load. The synchronizing unit 302 synchronizes the data at the time decided by the analyzing unit 303, and when performing the data synchronization, the synchronizing unit 302 reads the parameter change record table stored in the CPE and synchronizes the data in the parameter change record table.

Where the parameter unit 403 includes only the calculating unit 403-2: the calculating unit 403-2 of the CPE calculates the Hash value of a parameter with the attribute "Notify ACS of Changes". If the calculating unit 403-2 of the CPE calculates the Hash value of the parameter with the attribute "Notify ACS of Changes", the parameter value change notification message received by the receiving unit 301 carries the Hash value. The comparing unit 304 compares the Hash value currently received by the receiving unit 301 currently with the Hash value last received; the judging unit 305 judges whether the value of the parameter with the attribute "Notify ACS of Changes" in the CPE changes according to the comparison performed by the comparing unit 304. The analyzing unit 303 decides when to synchronize the data of the changed parameter value according to the judgment of the judging unit 305 and the current load. The synchronizing unit 302 synchronizes the data at the time decided by the analyzing unit 303, and when performing the data synchronization, the synchronizing unit 302 reads the parameter change record table stored in the CPE and synchronizes the data in the parameter change record table.

Where the parameter unit 403 includes both the generating unit 403-1 and the calculating unit 403-2: when the value of a parameter with the attribute "Notify ACS of Changes" in the CPE changes, the storing unit 402 of the CPE stores the change-related information, for example, the new parameter value and the time of parameter value change, in the parameter change record table created by the creating unit 401, and the generating unit 403-1 generates a 4VALUECHANGE event. The calculating unit of the CPE calculates the Hash value of the parameter with the attribute "Notify ACS of Changes".

The reporting unit 404 reports a parameter value change notification message that carries the 4VALUECHANGE event and the Hash value of the parameter with the attribute "Notify ACS of Changes" to the ACS. The receiving unit 301 of the ACS receives the parameter value change notification message from the CPE. It is known that the value of the parameter with the attribute "Notify ACS of Changes" changes according to the 4VALUECHANGE event. The comparing unit 304 compares the Hash value currently received by the receiving unit 301 with the Hash value last received; the judging unit 305 further judges whether the value of the parameter with the attribute "Notify ACS of Changes" in the CPE changes according to comparison performed by the comparing unit 304.

The analyzing unit 303 decides when to synchronize the data of the changed parameter value according to the judgment of the judging unit 305 and according to the current. The synchronizing unit 302 synchronizes the data at the time decided by the analyzing unit 303, and when performing the data synchronization, the synchronizing unit 302 reads the parameter change record table stored in the CPE and synchronizes the data in the parameter change record table.

From the above description, it is known that the CPE only notifies the ACS of the occurrence of a parameter change, but not the specific change, and the ACS decides when to synchronize the changed data to the ACS according to its own condition. Therefore, the requirement on the ACS is lowered and the burden of the ACS is relieved. In the case of a parameter marked as active notification, the CPE includes a parameter value change event in the Inform message when the next session is set up, instead of setting up a connection with the ACS immediately. This further reduces the burden of the ACS.

In addition, because the 4VALUECHANGE, event and the data in the parameter change record table can be stored continuously after the CPE is restarted, the ACS can synchronize the data accurately.

A system for data synchronization according to an embodiment of the present invention includes:

a CPE, which communicates with an ACS, and is configured to: create a parameter change record table, and when a value of a specific parameter changes, store parameter change information in the parameter change record table, generate a parameter change event, and/or calculate a digest of the specific parameter according requirements of the ACS, and report a parameter value change notification message that carries the parameter change event and/or the digest of the specific parameter to the ACS.

The operations performed by the CPE and the ACS are the same as described in the embodiments of the method.

Finally, the term "include", "comprise", or any other variant indicates a non-exclusive inclusion, so that a process, method, object, or device that includes a series of elements includes not only these elements but also other elements that are not listed, or elements that are inherent to the process, method, object, or device. In the case of no further limitations, an element preceded by "including one" does not exclude the situation that the process, method, object, or device which includes the element includes other same elements.

Based on the descriptions of the forming embodiments, those skilled in art will be clear that the embodiments of the present invention can be implemented by software and a necessary general hardware platform or implemented by hardware, but in most cases, the embodiment of the present invention are implemented by the former. Based on such understanding, all or a part of the technical solutions of the present invention that contribute to the prior art can be embodied by a software product, which can be stored in a computer readable storage medium, such as a Read Only Memory (ROM), a Random Access Memory (RAM), a magnetic disk, or a Compact Disk-Read Only Memory (CD-ROM). The software product includes a number of instructions that enable a computer device (which may be a personal computer, a server, or a network device) to execute the method according to the embodiments of the present invention or a certain part of an embodiment of the present invention.

The method, apparatus, and system for data synchronization provided by the invention have been described in detail in the above. Specific examples are illustrated in the specification to elaborate the principle and implementation of the present invention, and the illustration of the embodiments is intended to help to understand the method and core idea of the present invention. Furthermore, persons of ordinary skill in the art can make variations to the embodiments and application scope according to the idea of the present invention. Therefore, the content of the specification should not be construed as limitation to the present invention.

What is claimed is:

1. A method for data synchronization, wherein a parameter change record table is created, comprising:
   storing change information associated with a specific parameter in the parameter change record table when a value of the specific parameter changes;
   generating a parameter change event and calculating a digest of the specific parameter according to requirements of an Auto-Configuration Server (ACS);
   reporting a parameter value change notification message that carries the parameter change event and the digest of the specific parameter to the ACS;
   synchronizing data in the parameter change record table with the ACS upon receiving a synchronization command from the ACS, and
   wherein reporting the parameter value change notification message that carries the parameter change event and the digest of the specific parameter to the ACS comprises:
   creating a session with the ACS; and
   reporting the parameter value change notification message that carries the parameter change event and the digest of the specific parameter to the ACS.

2. The method for data synchronization according to claim 1, wherein reporting the parameter value change notification message that carries the parameter change event and the digest of the specific parameter to the ACS comprises reporting the parameter value change notification message that carries the parameter change event and the digest of the specific parameter to the ACS in a next session, and wherein the parameter value change notification message is contained in a notification message of the next session.

3. A Customer Premises Equipment (CPE), comprising:
   a processor;
   a memory configured to store instructions executable by the processor to perform the steps of:
   creating a parameter change record table;
   storing parameter change information that is associated with a specific parameter in the parameter change record table when a value of the specific parameter changes;
   generating a parameter change event and calculating a digest of the specific parameter according to requirements of an Auto-Configuration Server (ACS);
   reporting a parameter value change notification message that carries the parameter change event and the digest of the specific parameter to the ACS;
   synchronizing data in the parameter change record table with the ACS upon receiving a synchronization command from the ACS, and
   wherein reporting the parameter value change notification message that carries the parameter change event and the digest of the specific parameter to the ACS comprises:
   creating a session with the ACS; and
   reporting the parameter value change notification message that carries the parameter change event and the digest of the specific parameter to the ACS.

4. The CPE according to claim 3, wherein the parameter change record table comprises an indication of a parameter name associated with the specific parameter, an indication of a new value of the specific parameter, an indication of an old value of the specific parameter, and an indication of a time when the specific parameter is changed.

5. The CPE according to claim 3, wherein the processor is configured to delete the parameter change information from the memory after the CPE synchronizes the data in the parameter change record table with the ACS.

6. The CPE according to claim 3, wherein the parameter change event and the digest of the specific parameter notify the ACS of the specific parameter change but do not include the value of the specific parameter change.

7. The CPE according to claim 3, wherein the memory comprises a plurality of parameters, wherein each of the plurality of parameters is associated with one of a plurality of notification attributes, wherein the plurality of notification attributes comprise a notification off attribute, a passive notification attribute, and an active notification attribute, wherein the CPE is configured to not notify the ACS of changes to parameters associated with the notification off attribute, wherein the CPE is configured to notify the ACS of changes to parameters associated with the passive notification attribute when a next session is set up, and wherein the CPE is configured to immediately notify the ACS of changes to parameters associated with the active notification attribute when the changes are made.

8. The CPE according to claim 7, wherein the memory is configured to store changes made to the parameters associated with the passive notification attribute and changes made to the parameters associated with the active notification attribute to the parameter change record table.

9. The CPE according to claim 7, wherein each of the plurality of notification attributes is represented by a different integer.

10. The CPE according to claim 3, wherein the CPE comprises an Internet Protocol (IP) based terminal device, and wherein the ACS is configured to perform auto configuration of the CPE.

11. The CPE according to claim 3, wherein generating the parameter change event and calculating the digest of the specific parameter comprise calculating a hash value of the specific parameter.

12. The CPE according to claim 11, wherein the hash value is configured to be compared by the ACS to a last received hash value for the specific parameter to enable the ACS to determine that the specific parameter has changed.

13. The CPE according to claim 3, wherein a time when the synchronization command is received from the ACS is determined based at least in part on a load condition of the ACS.

14. The CPE according to claim 13, wherein the time when the synchronization command is received from the ACS is further determined based at least in part on an attribute included with the parameter change event and the digest of the specific parameter.

15. The CPE according to claim 14, wherein the attribute included with the parameter change event and the digest of the specific parameter indicates that the specific parameter is to be synchronized with the ACS immediately.

16. The CPE according to claim 14, wherein the attribute included with the parameter change event and the digest of the specific parameter indicates that the specific parameter is to be synchronized with the ACS when a next session is set up.

17. The method for data synchronization according to claim 1, wherein storing the change information in the parameter change record table comprises storing an indication of a parameter name associated with the specific parameter, storing an indication of a new value of the specific parameter, storing an indication of an old value of the specific parameter, and storing an indication of a time when the specific parameter is changed.

18. The method for data synchronization according to claim 1, wherein reporting the parameter value change notification message comprises notifying the ACS of the specific parameter change but not notifying the ACS of the value of the specific parameter change.

19. The method for data synchronization according to claim 1, wherein reporting the parameter value change notification message comprises sending the ACS a parameter attribute that indicates when the ACS should send the synchronization command, and wherein the method further comprises deleting the change information in the parameter change record table after the parameter change record table is synchronized with the ACS.

* * * * *

UNITED STATES PATENT AND TRADEMARK OFFICE
CERTIFICATE OF CORRECTION

| | | |
|---|---|---|
| PATENT NO. | : 8,630,977 B2 | Page 1 of 1 |
| APPLICATION NO. | : 13/101442 | |
| DATED | : January 14, 2014 | |
| INVENTOR(S) | : Ping Fang | |

It is certified that error appears in the above-identified patent and that said Letters Patent is hereby corrected as shown below:

On the Title Page, References Cited, Item 56 under Other Publications, the following cited art should read:

"Blackford, J., "WT-148 Configuration Synchronization Proposed Solution", DSL Home Technical Working Group."

Title Page 2, References Cited, Item 56 under Other Publications, the following cited art should read:

"First Chinese Office Action dated (mailed) Jul. 13, 2010, issued in related Chinese Application No. 200510090318.4, Huawei Technologies Co., Ltd.

Second Chinese Office Action dated (mailed) Jan. 10, 2011, issued in related Chinese Application No. 200510090318.4, Huawei Technologies Co., Ltd.

International Search Report for International Application No. PCT/CN2009/074522, mailed Feb. 21, 2008, Huawei Technologies Co., Ltd."

In the Claims

Column 9/Line 53 should read: "mand from the ACS,"

Column 10/Line 20 should read: "mand from the ACS,"

Signed and Sealed this
First Day of April, 2014

Michelle K. Lee
*Deputy Director of the United States Patent and Trademark Office*